Aug. 24, 1937.  I. VANT  2,090,650
MEAT GRINDER
Filed Nov. 12, 1935   2 Sheets-Sheet 1
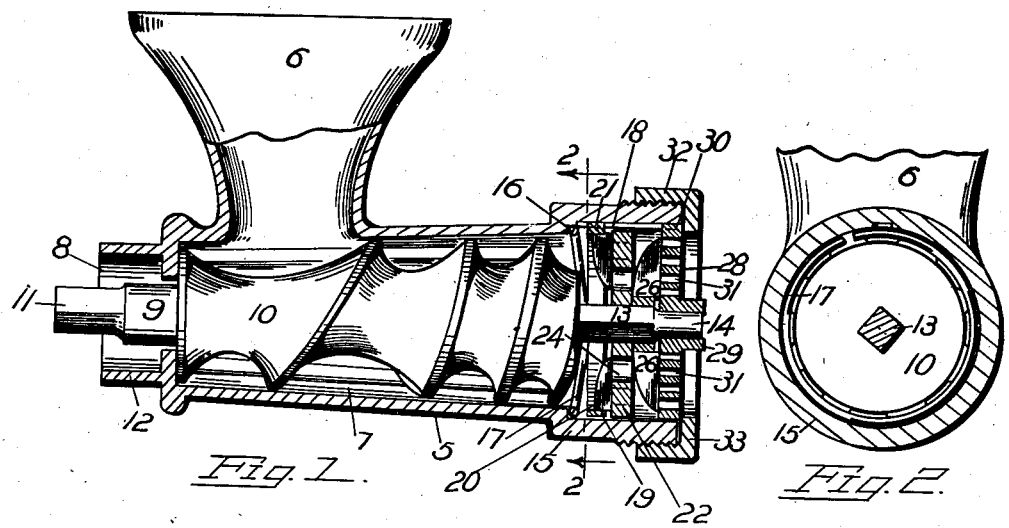
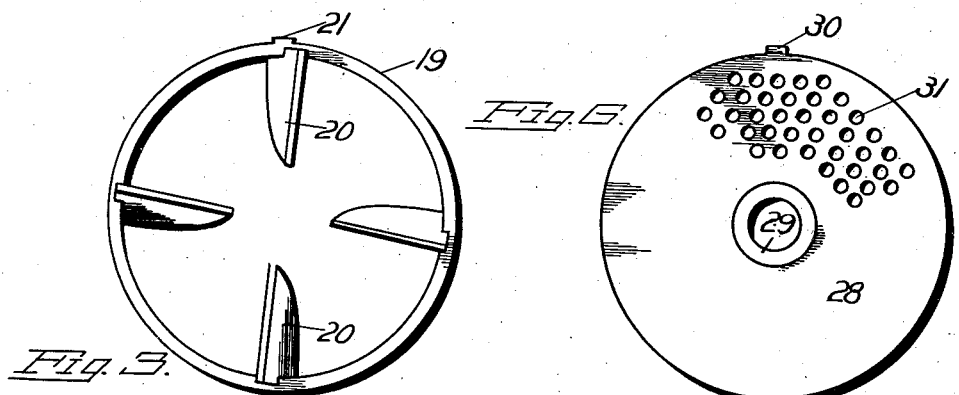
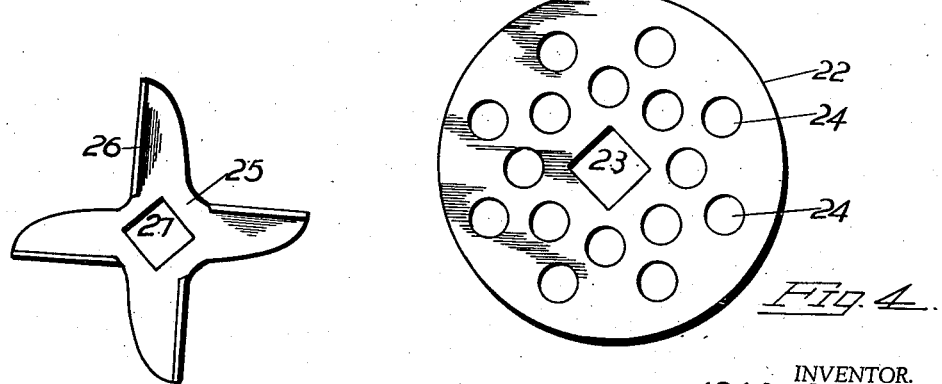
INVENTOR.
ISADORE VANT
BY
ATTORNEY.

Aug. 24, 1937.  I. VANT  2,090,650
MEAT GRINDER
Filed Nov. 12, 1935  2 Sheets-Sheet 2
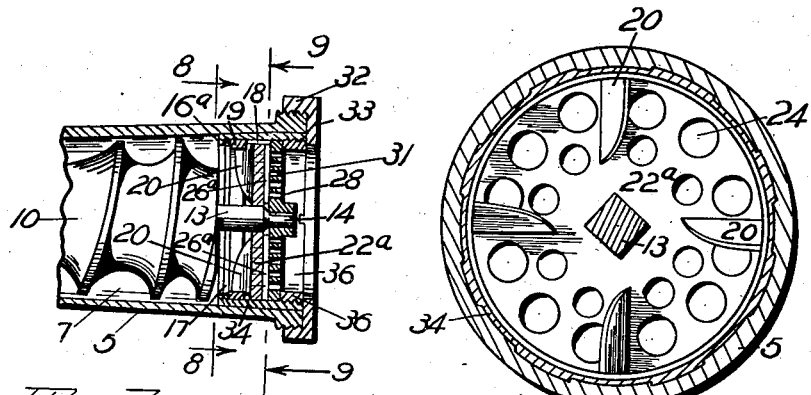
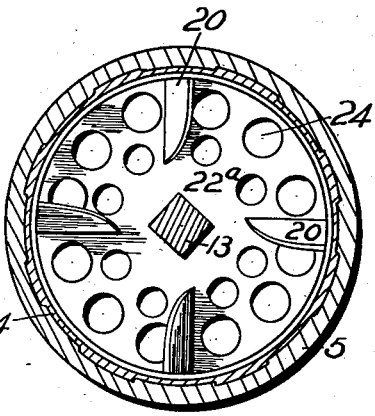
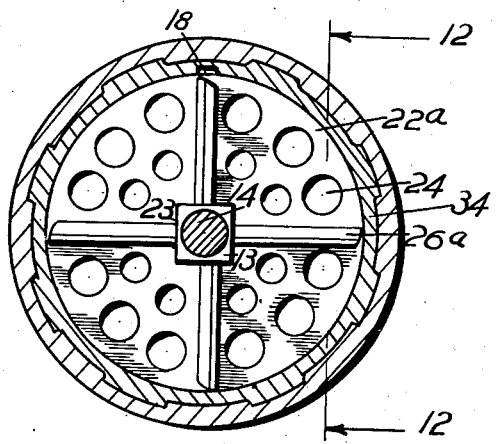
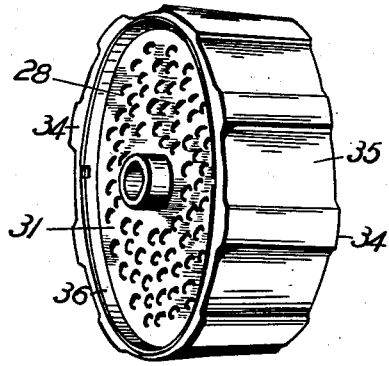
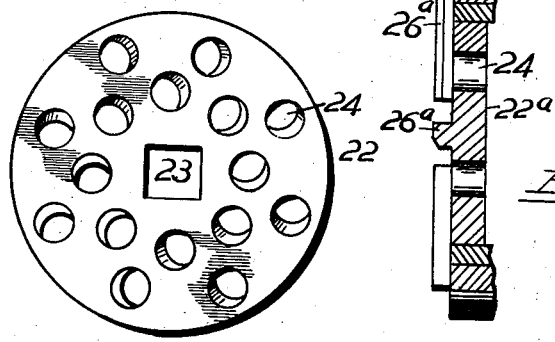
INVENTOR.
ISADORE VANT
BY
ATTORNEY.

Patented Aug. 24, 1937

2,090,650

UNITED STATES PATENT OFFICE 2,090,650

MEAT GRINDER

Isadore Vant, Denver, Colo.

Application November 12, 1935, Serial No. 49,367

9 Claims. (Cl. 146—187)

This invention relates to improvements in meat grinders of the type employed in meat markets, hotels and homes.

It is an object of this invention to produce a meat grinder that shall be so constructed that it will subject the meat to a coarse and a fine grinding operation and subject the meat after the coarse grinding operation, and before the fine grinding operation to a stirring or mixing operation so as to produce a better mixture of the fats and leans.

Another object of this invention is to produce a grinder in which the pressure between the knife or knives and the cutting disk or disks will be entirely independent of the thrust on the feed screw, thereby eliminating a source of friction and reducing the power necessary to operate the grinder to a minimum.

A further object is to produce a grinder in which the knife which effects the first grinding operation is non-rotatable and in which the meat and gristle will not wind about the knife and block the passage of meat through the grinder.

A still further object of this invention is to produce a grinder of such construction that the knives and shear plates will be held in operative engagement by spring pressure so as to prevent excessive pressures to be applied and so that the wear and frictional resistance will be maintained at a minimum.

The above and other objects that may become apparent as the description proceeds are attained by means of a construction and an arrangement of parts that will now be described in detail, and for this purpose reference will be had to the accompanying drawings in which the invention has been illustrated, and in which Figure 1 is a longitudinal, diametrical section taken on a vertical plane, a portion of the hopper being shown in elevation;

Figure 2 is a transverse section taken on line 2—2, Figure 1;

Figure 3 is a plan view of the stationary knife;

Figure 4 is a plan view of the rotating shear plate that cooperates with the stationary knife;

Figure 5 is a plan view of the rotating knife;

Figure 6 is a plan view of the stationary shear plate with which the rotating knife cooperates;

Figure 7 is a diametrical section showing the invention applied to a meat grinder of the usual construction;

Figure 8 is a section, to a somewhat enlarged scale, taken on line 8—8, Figure 7;

Figure 9 is a section taken on line 9—9, Figure 7, and shows the outer face of the rotatable shear plate which in this case has knife blades formed integral therewith;

Figure 10 is a perspective view of a grinder attachment, showing the same detached from the grinder, the end visible in this view being the discharge or outer end thereof;

Figure 11 is a view similar to the one shown in Figure 4, and illustrates a modification in which the openings in the plate are helically arranged; and Figure 12 is a section taken on line 12—12, Figure 9.

In the drawings reference numeral 5 represents the housing of the grinder. In the main features, this housing is the same as those now in use, and has a feed hopper 6 which communicates with the small end of the frusto-conical, longitudinal opening 7 whose inner surface is provided with the usual longitudinal ribs whose function it is to prevent the meat from turning in the casing.

A perforated wall or partition 8 partially closes the small end of the opening, and the hole in the partition forms a bearing for the shank 9 of the feed screw or worm 10. The end of the shank is squared, as indicated by reference numeral 11, for convenience in making connection to the drive shaft of a motor.

The left hand end of the housing (Figure 1) has a cylindrical section 12 for making connection with a motor frame. The worm is of the usual construction and terminates at its enlarged end in a square shaft 13, whose extreme outer end is cylindrical, as indicated by reference numeral 14. The housing terminates in an enlarged cylindrical section 15 whose inside diameter is larger than the adjacent end of the opening 7, so as to form a shoulder 16 on which is seated a spring 17. The inside surface of the cylindrical extension 15 has one or more longitudinal grooves 18, whose function will hereinafter appear.

A knife, comprising a circular rim 19 and a plurality of radial, inwardly extending blades 20 is positioned in the cylindrical extension 15, and rests on the wavy spring 17 in the manner shown in Figure 1.

The rim 19 has a lug 21 that engages in the groove 18, and holds the knife from turning. The groove 18 may be replaced by a rib, and the projection 21 by a notch if any advantage is found in such a reversal.

A shear plate 22, shown in plan view in Figure 4 and in a slightly modified form in Figure 11, is provided with a square central opening 23 for the reception of the square shaft 13. The diameter of the shear plate is just a little less than the diameter of the opening in the cylindrical member 15 so that it may rotate freely therein. The shear plate is provided with a plurality of openings 24, whose axes may be perpendicular to its plane, as shown in Figure 4, or inclined thereto, as shown in Figure 11.

A knife 25, like the one shown in Figure 5, and which is preferably provided with four radially extending or outwardly ranging blades 26, is positioned on the shaft 13 just outside of the shear plate 22. Knife 25 has a square central opening 27 of the proper size to receive the shaft 13.

A shear plate 28 of substantially the same diameter as the opening in the cylindrical extension 15 has a central bearing 29 for the reception of the cylindrical extension 14.

The periphery of the shear plate 28 has a lug 30 which engages the groove 18 or a corresponding notch if the groove is replaced by a ridge, and holds it from rotation. Plate 28 is provided with a plurality of holes 31 that are of smaller diameter than the corresponding holes 24 in the shear plate 22. A ring 32 has a threaded engagement with the outer end of the cylindrical extension 15, and has an inwardly extending flange 33 that overlaps the shear plate 28 and holds the parts in the assembled relation illustrated in Figure 1.

The spring 17 is wavy, and acts to force the assembly of shear plates and cutters against the flange 33. By making the spring 17 of the proper size and material, the knives will be held against the shear plates with the optimum amount of force.

It is evident from the above that the worm or screw has nothing to do with holding the knives or cutters in engagement with the shear disks, and therefore the only thrust against the partition 8 is that due to propelling the meat, and this lessens the frictional resistance and the power necessary to turn the feed screw.

Since the knives and shear plates are held in operative contact by the action of the spring 17, no excessive pressures are employed, and therefore the friction and the wear is reduced to a minimum which assures that the knives will keep sharp longer, and that the power required will be a minimum.

After the meat has been coarse cut by passing through the shear plate 22, it enters the space between the two shear plates where a further stirring or mixing takes place with the result that the leans and fats will be more uniformly intermingled.

The knife blades 20 are stationary and therefore there is no tendency for the meat and gristle to wind about the same, and the passage will therefore not be obstructed.

Since the shear plate 22 rotates relative to the knife blades 20, there is some advantage in slanting the holes 24 in the manner indicated in Figure 11. The axes of the holes are inclined so that the discharge ends follow the intake ends and in this way the meat flows somewhat more freely.

In Figure 9 the shear plate 22a has been shown as provided with knife blades 26a formed integral therewith and such a shear plate can be substituted for the plate 22 and knife 25 with a consequent reduction of the number of parts.

In Figures 7, 8 and 10, the invention has been illustrated in such a form that it can be applied as an attachment to ordinary meat grinders of the type described, and which are not provided with the cylindrical extension 15.

In this form, the several shear plates and cutters or knives are assembled in a separate short cylinder 34, whose outer surface is tapered to fit the taper of the opening 7. The outer surface is fluted, as indicated at 35, to correspond to the flutings on the inner surface of opening 7. The opening in member 34 is cylindrical, and corresponds to the opening in the cylindrical extension 15 in Figure 1. A shoulder 16a is provided at the inner end of cylinder 34, and this serves as an abutment for the spring 17. The cutter 19, the shear plate 22a, with the integral blades 26a, and the shear plate 28 are assembled in the same way as explained in connection with Figure 1, and the assembly is held in place by a ring 36. The cylinder is held in place by a clamping ring 33, whose inwardly extending flange engages the outer end thereof in the manner shown in Figure 7. The worm 10 is provided with a square shaft 13 whose outer end has a cylindrical section 14 as described in connection with Figure 1.

In the claims the discharge end of the grinder will be referred to as the "outer" end and the shear plate 28 as the "outer shear plate" while knife 20 will be designated as the "inner knife".

From the above description, it will be apparent that the meat grinder which forms the subject of this invention subjects the meat to two successive grinding operations, thereby obviating the necessity of passing it through the grinder twice.

Since the pressure between the shear disks and the knives or cutters is obtained by means of a spring 17, it can be maintained uniform at all times, and at the most desirable value. Other advantages, pointed out in the above portions of this specification, also flow from the construction described.

It is, of course, obvious that as many sets of grinders as may be desirable can be arranged in series or tandem, but applicant has shown only two sets, as this is believed to clearly illustrate the invention.

Having described the invention what is claimed as new is:

1. A grinder comprising a housing defining a passage between a feed inlet and a discharge outlet therein, means for moving material from the inlet to the outlet, and an assembly of cutters within the housing in the path of material moving through the same, comprising a stationary blade disposed to first act on the material, a rotary perforated shear plate in cooperative relation therewith, a rotary cutting blade to next act on the material, and a stationary perforated shear plate in cooperative relation therewith.

2. A grinder comprising a housing defining a passage between a feed inlet and a discharge outlet therein, means for moving material from the inlet to the outlet, an assembly of cutters within the housing in the path of material moving through the same, comprising a stationary cutter blade disposed to first act on the material, a rotary perforated shear plate in cooperative relation therewith, a rotary cutting blade to next act on the material, a stationary perforated shear plate in cooperative relation therewith, means comprising a spring positioned between the inner cutter blade and the housing, providing a resilient abutment, and means comprising a flanged ring having threaded engagement with the housing for resisting the action of the spring.

3. A grinder comprising a housing defining a passage between a feed inlet and a discharge outlet therein, means for moving material from the inlet to the outlet, and an assembly of cutters slidably fitted in the housing in the path of material moving through the same, and comprising a hollow casing, a stationary blade within the casing disposed to first act on the material, a rotary perforated shear plate in cooperative relation therewith, a rotary cutting blade in the casing to next act on the material, and a stationary perforated shear plate in cooperative relation therewith.

4. A grinder comprising a housing defining a passage between a feed inlet and a discharge outlet therein, means for moving material from the inlet to the outlet, and an assembly of cutters within the housing in the path of the material moving through the same, comprising a stationary blade disposed to first act on the material, a rotary perforated shear plate in cooperative relation therewith, and a stationary perforated shear plate having a transversely extending blade on its face adjacent the rotary shear plate and in cooperative relation therewith.

5. In a meat grinder having a housing provided at one end with a feed hopper and having a screw for feeding the meat from the hopper toward the other end, means for grinding the meat comprising a knife provided with inwardly ranging blades, a perforated shear plate located in the housing, its inner surface contacting with the knife, means for holding the knife from rotating, a second shear plate located beyond the first mentioned one, outwardly ranging knife blades located between the two shear plates and in operative engagement with the second one, means engaging the second shear plate for holding it from outward movement, means for holding the second shear plate from rotating, means comprising a spring for urging the inner knife against the adjacent shear plate, and the second mentioned knife against the second shear plate, and means comprising the screw for turning the inner shear plate and the second mentioned knife blades relative to the inner stationary knife and the stationary shear plate.

6. In a meat grinder having a housing provided at one end with a feed hopper and having a screw for feeding the meat from the hopper toward the outer end thereof, the outer end of the housing terminating in a cylindrical opening, a shoulder at the inner end of the cylindrical opening, a knife provided with a plurality of substantially radial blades located in the inner end of the cylindrical opening, means for holding the knife from turning relative to the housing, a shear plate having a plurality of perforations, located in the cylindrical opening with its inner surface in operative engagement with the knife blades, a second shear plate located beyond the first and provided with a plurality of perforations, which are smaller than the perforations in the first mentioned shear plate, a plurality of outwardly ranging knife blades in operative engagement with the inner surface of the second shear plate, means for limiting the outward movement of the second shear plate, resilient means, comprising a spring, positioned between the shoulder and the inner surface of the inner knife for urging the knives into operative engagement with their adjacent shear plates, means for holding the second shear plate from turning, and means comprising the screw for turning the first mentioned shear plate relative to the inner knife and the outer knife blades relative to the second mentioned shear plate.

7. In a meat grinder having a housing provided with an opening, a feed hopper in communication with one end of the opening, and means comprising a screw for moving material from the feed hopper to the discharge end of the opening, grinding means positioned in the discharge end of the opening, said means comprising two sets of grinders each set consisting of a perforated shear plate and a knife having outwardly ranging blades, the knives being located against the inside surfaces of their respective shear plates, the inner knife and the outer shear plate being held against rotation, means comprising the screw for rotating the inner shear plate and the outer knife, means for holding the assembly of knives and shear plates in assembled relation, and resilient means for urging the knives toward the adjacent surfaces of their respective shear plates.

8. A grinder assembly for use in converting a meat grinder having a single grinder to one having two grinders arranged in series, comprising a hollow member having a cylindrical opening terminating at its inner end in a shoulder, a spring positioned against the shoulder, a knife, having a plurality of blades, supported by the spring, means for holding the knife from turning in the opening, a perforated shear plate rotatably mounted in the opening with its inner surface in engagement with the blades of the knife, the shear plate having a central non-circular opening for the reception of a driving member, a knife located adjacent the outside of the shear plate, a second perforated shear plate, located on the outside of the second knife, means for holding the outer shear plate from rotating, and means comprising a flanged ring in adjustable relation to the hollow member for holding the assembly against movement outwardly while permitting inward movement to the extent permitted by the spring.

9. A device in accordance with claim 8 in which the knife blades that cooperate with the outer shear plate are integral with the inner shear plate.

ISADORE VANT.